United States Patent
Smith

(10) Patent No.: US 8,281,282 B2
(45) Date of Patent: Oct. 2, 2012

(54) METHOD AND APPARATUS FOR IN-BUILT SEARCHING AND AGGREGATING FUNCTIONALITY

(75) Inventor: Michael Robert Smith, Ringwood East (AU)

(73) Assignee: CA, Inc., Islandia, NY (US)

( * ) Notice: Subject to any disclaimer, the term of this patent is extended or adjusted under 35 U.S.C. 154(b) by 1104 days.

(21) Appl. No.: 11/409,447

(22) Filed: Apr. 20, 2006

(65) Prior Publication Data

US 2006/0242132 A1 Oct. 26, 2006

Related U.S. Application Data

(60) Provisional application No. 60/675,004, filed on Apr. 26, 2005, provisional application No. 60/734,822, filed on Nov. 9, 2005.

(51) Int. Cl.
G06F 9/44 (2006.01)

(52) U.S. Cl. ........ 717/108; 717/109; 717/110; 717/113; 717/116; 707/755; 707/769; 707/770

(58) Field of Classification Search ................ 717/108, 717/114, 116, 118, 148
See application file for complete search history.

(56) References Cited

U.S. PATENT DOCUMENTS

| | | | | |
|---|---|---|---|---|
| 5,265,254 A * | 11/1993 | Blasciak et al. | | 717/130 |
| 5,659,682 A * | 8/1997 | Devarakonda et al. | | 714/47 |
| 5,732,264 A * | 3/1998 | Tanaka | | 717/116 |
| 5,940,830 A * | 8/1999 | Ochitani | | 707/10 |
| 5,970,490 A * | 10/1999 | Morgenstern | | 1/1 |
| 6,016,508 A * | 1/2000 | Chu et al. | | 709/223 |
| 6,219,678 B1 * | 4/2001 | Yelland et al. | | 707/206 |
| 6,374,266 B1 * | 4/2002 | Shnelvar | | 707/204 |
| 6,393,472 B1 * | 5/2002 | Anerousis et al. | | 709/223 |
| 6,427,230 B1 * | 7/2002 | Goiffon et al. | | 717/108 |
| 6,442,546 B1 * | 8/2002 | Biliris et al. | | 1/1 |
| 6,442,748 B1 * | 8/2002 | Bowman-Amuah | | 717/108 |
| 6,601,234 B1 * | 7/2003 | Bowman-Amuah | | 717/108 |
| 6,618,852 B1 * | 9/2003 | van Eikeren et al. | | 717/108 |
| 6,865,580 B1 * | 3/2005 | Bush | | 717/116 |
| 6,907,546 B1 * | 6/2005 | Haswell et al. | | 714/38 |
| 6,970,939 B2 * | 11/2005 | Sim | | 709/236 |
| 6,993,743 B2 * | 1/2006 | Crupi et al. | | 717/102 |
| 7,058,956 B1 * | 6/2006 | Harjanto | | 719/316 |
| 7,073,129 B1 * | 7/2006 | Robarts et al. | | 715/740 |
| 7,080,059 B1 * | 7/2006 | Poston et al. | | 707/1 |
| 7,082,386 B2 * | 7/2006 | Srinivasa | | 703/2 |
| 7,194,451 B2 * | 3/2007 | Chaudhuri et al. | | 1/1 |
| 7,206,805 B1 * | 4/2007 | McLaughlin, Jr. | | 709/203 |
| 7,233,974 B2 * | 6/2007 | Kawahara et al. | | 709/205 |
| 7,290,056 B1 * | 10/2007 | McLaughlin, Jr. | | 709/230 |
| 7,290,072 B2 * | 10/2007 | Quraishi et al. | | 710/105 |
| 7,389,335 B2 * | 6/2008 | MacLeod et al. | | 709/223 |

(Continued)

OTHER PUBLICATIONS

Title:DMS service management , author: DeLoria, W.C et al, source: IEEE, dated 1995.*

(Continued)

Primary Examiner — Chameli Das
(74) Attorney, Agent, or Firm — Baker Botts L.L.P.

(57) ABSTRACT

According to one embodiment of the invention a computer-readable media stores code that is operable to be executed on a processor. The code includes a JAVA class having objects with associated attributes and also having at least one method. The at least one method is operable, when executed on the processor, to search the objects across any attribute of the objects.

54 Claims, 3 Drawing Sheets

U.S. PATENT DOCUMENTS

| | | | |
|---|---|---|---|
| 7,468,731 B2* | 12/2008 | Eldridge et al. | 345/581 |
| 7,516,157 B2* | 4/2009 | Cameron et al. | 1/1 |
| 7,620,630 B2* | 11/2009 | Lloyd et al. | 1/1 |
| 7,650,644 B2* | 1/2010 | Cheng et al. | 726/27 |
| 7,941,457 B2* | 5/2011 | Pfeiffer et al. | 707/802 |
| 2002/0010809 A1* | 1/2002 | Lipe et al. | 709/331 |
| 2002/0073396 A1* | 6/2002 | Crupi et al. | 717/104 |
| 2002/0116362 A1* | 8/2002 | Li et al. | 707/1 |
| 2003/0037044 A1* | 2/2003 | Boreham et al. | 707/3 |
| 2003/0055917 A1* | 3/2003 | Boreham et al. | 709/220 |
| 2003/0074430 A1* | 4/2003 | Gieseke et al. | 709/221 |
| 2003/0105654 A1* | 6/2003 | MacLeod et al. | 705/7 |
| 2003/0105733 A1* | 6/2003 | Boreham et al. | 707/1 |
| 2003/0208540 A1* | 11/2003 | Kawahara et al. | 709/205 |
| 2003/0225876 A1* | 12/2003 | Oliver et al. | 709/224 |
| 2004/0015408 A1* | 1/2004 | Rauen et al. | 705/26 |
| 2004/0088189 A1* | 5/2004 | Veome et al. | 705/2 |
| 2004/0111513 A1* | 6/2004 | Shen | 709/226 |
| 2004/0199485 A1* | 10/2004 | Caswell | 707/1 |
| 2004/0254014 A1* | 12/2004 | Quraishi et al. | 463/29 |
| 2005/0005261 A1* | 1/2005 | Severin | 717/108 |
| 2005/0071803 A1* | 3/2005 | Cherdron et al. | 717/101 |
| 2005/0102297 A1* | 5/2005 | Lloyd et al. | 707/100 |
| 2005/0192921 A1* | 9/2005 | Chaudhuri et al. | 707/1 |
| 2006/0059140 A1* | 3/2006 | Noe et al. | 707/4 |
| 2006/0080353 A1* | 4/2006 | Miloushev et al. | 707/102 |
| 2006/0106836 A1* | 5/2006 | Masugi et al. | 707/101 |
| 2009/0216851 A1* | 8/2009 | Digate et al. | 709/206 |
| 2010/0042645 A1* | 2/2010 | Bakalash et al. | 707/102 |
| 2010/0100558 A1* | 4/2010 | Bakalash et al. | 707/756 |
| 2010/0185581 A1* | 7/2010 | Bakalash et al. | 707/602 |
| 2010/0332480 A1* | 12/2010 | Verreaux | 707/741 |

OTHER PUBLICATIONS

Title: A directory service for a federation of CIM databases with migrating objects, Patankar, A.K, IEEE, dated: 1996.*

Bloch, Joshua; "*Trail: Collections*;" http://java.sun.com/docs/books/tutorial/collections/index.html; printed Apr. 20, 2006; Sun Microsystems, Inc.; 1 page.

Dieselpoint Java Search & Navigation Software; web page: http://dieselpoint.com; printed Apr. 20, 2006; 1 page.

PCT Notification of Transmittal of the International Search Report and the Written Opinion of the International Searching Authority, or the Declaration re PCT/US2006/015895 filed Apr. 26, 2006 (11 pages), Sep. 26, 2006.

Todd Sundsted, JNDI Overview, Part 2: An Introduction to Directory Services, *Java World* [Online] 2000, XP002397478 online (6 pages). Retrieved Sep. 4, 2000, Feb. 2000.

Budi Kurniawan, Making Java Objects Comparable, *On Java*, [Online] 2003, XP002397479 online (11 pages). Retrieved Sep. 5, 2006, Mar. 12, 2003.

* cited by examiner

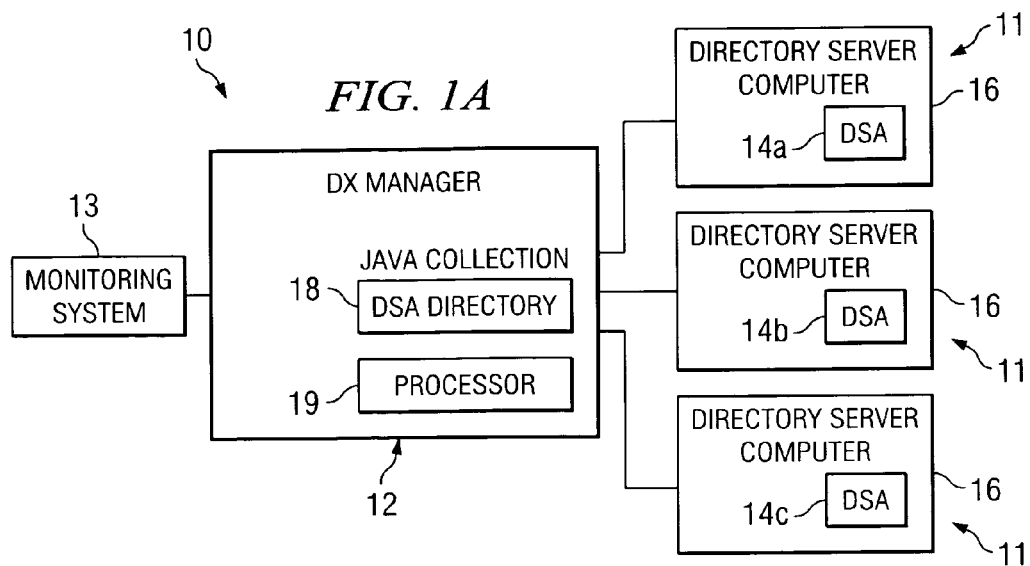
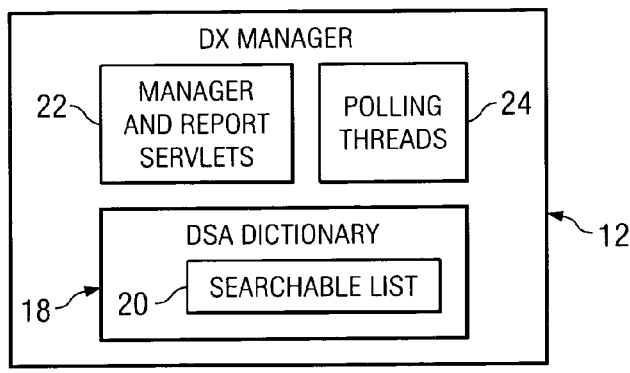
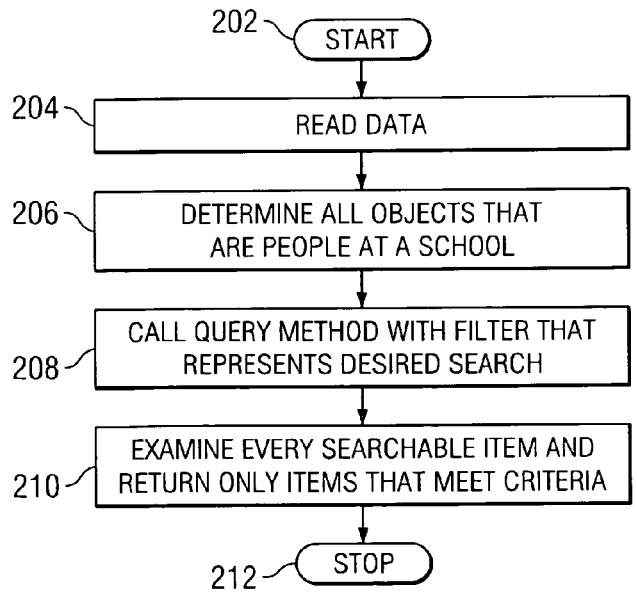

METHOD AND APPARATUS FOR IN-BUILT SEARCHING AND AGGREGATING FUNCTIONALITY

RELATED APPLICATIONS

This application claims the benefit under 35 U.S.C. §119 (e) of U.S. Provisional Application Ser. No. 60/675,004, filed Apr. 26, 2005 and U.S. Provisional Application Ser. No. 60/734,822, filed Nov. 9, 2005.

TECHNICAL FIELD OF THE INVENTION

This invention relates generally to computer directories and more particularly to a method an apparatus for in-built searching and aggregating functionality.

BACKGROUND OF THE INVENTION

It is a common programming practice to use a hash table to store attributes about a given entity, for example a person's age, salary, title, address, or a computer's name, network address, hardware specification, asset number, or a directory server's configuration, running state, error count and performance counters (representing current load). Constructing lists of these hash tables to keep track of many of these entities is also very common. This list can be referred to, and thought of, as a dictionary or directory, which can be accessed to reference information concerning each entity it contains. Conventionally, if one desired to search such data stored in a hash table, such a search was typically performed by a pre-designated primary key of the hash table.

SUMMARY OF THE INVENTION

According to one embodiment of the invention a computer-readable media stores code that is operable to be executed on a processor. The code includes a JAVA class having objects with associated attributes and also having at least one method. The at least one method is operable, when executed on the processor, to search the objects across any attribute of the objects.

Embodiments of the invention may provide numerous technical advantages. Some, none, or all embodiments may benefit from the below described advantages. According to one embodiment, a collection of data structures, such as those stored in hash tables, may be searched based on any attribute of the data structure. For example, personnel records may be searched for office, job title, region, etc., rather than simply searching based on a predetermined primary key. In another embodiment, automatic aggregation of numeric values stored in a data structure may occur. For example, the rain fall in each state may be automatically aggregated. As another example, the "state" of certain machines may be aggregated. These above functionalities may be provided, in some embodiments, in a JAVA data structure.

Other technical advantages will be apparent to one of skill in the art.

BRIEF DESCRIPTION OF THE DRAWINGS

A more complete understanding of embodiments of the invention will be apparent from the detailed description taken in conjunction with the accompanying drawings in which:

FIG. 1A is a block diagram of a computer network according to the teachings of the invention;

FIG. 1B is a block diagram of a manager of the system of FIG. 1A;

FIG. 4 is a flow chart illustrating one embodiment of the operation of a search of data according to the teachings of the invention.

DETAILED DESCRIPTION OF EXAMPLE EMBODIMENTS OF THE INVENTION

Figure 2:
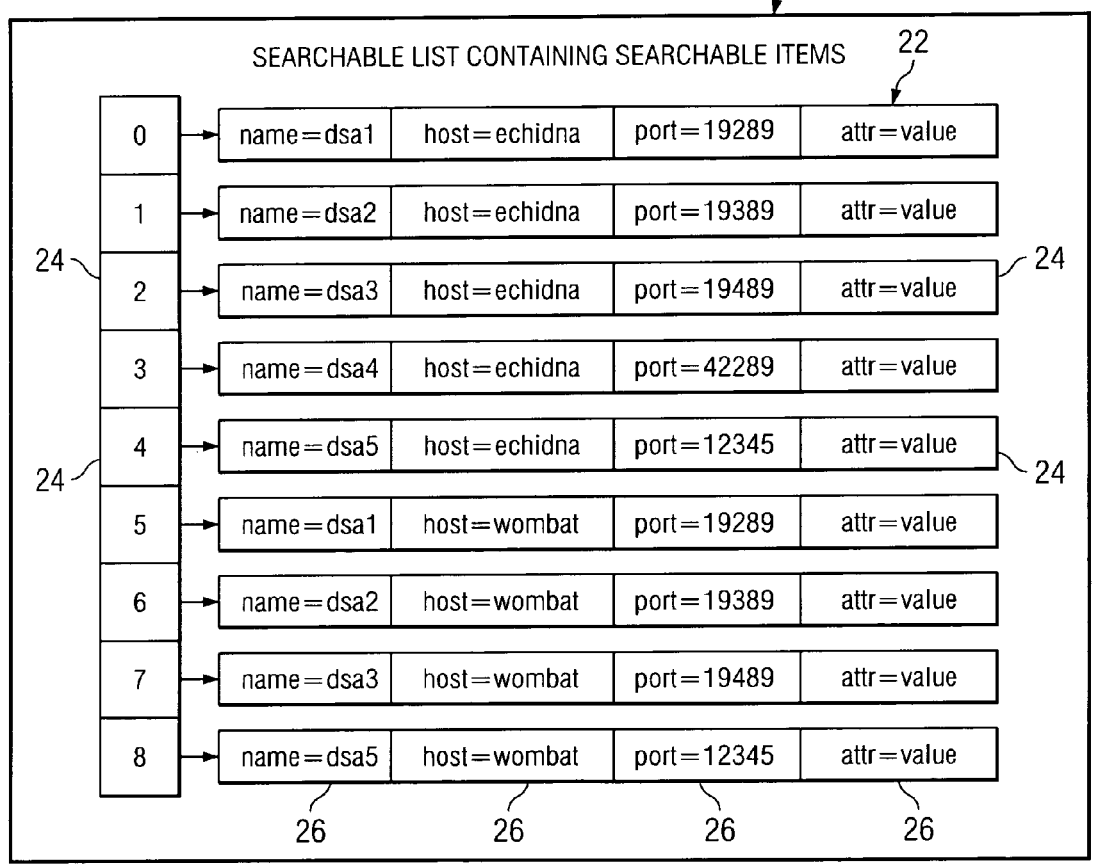
FIG. 2 is a block diagram of the Searchable list class of the manager of FIG. 1B.

Example embodiments of the present invention and their advantages are best understood by referring to FIGS. 1A through 4 of the drawings, like numerals being used for like and corresponding parts of the various drawings.

The present invention applies generally to he internal searching and aggregation of stored data within data structures within programs written in the JAVA Programming Language. According to one embodiment, arbitrary data can be stored in such a way so it may be easily searched and aggregated. The teachings of the invention recognize that it is often desirable to search a list of entities based on specific criteria, such as people between the age of 18-35, or more complex searching based on multiple criteria, for example males within a specific age range who live in a given set of locations. However, the teachings of the invention also recognize that the typical approach for searching hash tables is based on a pre-defined primary key, and that aggregation of any attribute is not supported.

According to the teachings of the invention, to be particularly useful, a search function may support an arbitrary number of logical terms that can be compounded to make the search as specific as desired. Further, aggregated values across search results may be provided. For example, if a dictionary or directory contains information about books, a determination of the total cost of all the books on cookery published this year could be made, in one embodiment.

Particular embodiments of the invention further extend the above by utilizing grouping. It may be desirable to search all the books in the dictionary or directory and provide a total cost of all books for each of the subjects, cookery being just one. In this case the aggregations would be grouped by subject.

The JAVA programming language provides a number of data structures under its collections framework that assist in data modeling. However, currently these do not provide: (1) any method of searching hashed data based on a logical expression related to their keys and data, e.g., ((age>=18) && (age<=35)); (2) any method of aggregating numeric values across any given set or subset of the data; and (3) any method of specifying the grouping to apply to these aggregations. Certain embodiments of the invention provide each of these functions.

This disclosure describes data structures and methods that can be used to implement a general purpose dictionary or directory to track information concerning any real-world item. Such dictionaries or directories are useful to many programs internally in tracking information. One example use is to track the health and load of directory servers in a distributed network environment, but the teachings of the invention could equally be used to track the state of any network device, for example computers, mobile phones, or information relating to individual users. Details of an example implementation are described below with reference to FIGS. 1A through 4.

FIG. 1A is a block diagram of a computer network 10 illustrating an example implementation of one embodiment of the invention. In this embodiment, the health and load of directory servers 11 is tracked, and the performance counters of a group of directory servers 11 is aggregated. A monitoring system 13 may use the invention to display the total number of errors along with the total number of directory operations (binds, searches, updates etc.) across specific groups of directory servers being monitored. Directory servers 11 are typically grouped into geographic regions, so the monitoring system 13 can show the aggregated health and load in each region.

Computer network 10 includes a manager 12, which in this embodiment tracks the health and load of plurality of directory service agents (DSA) 14 in a distributed network environment. One example of manager 12 is the Computer Associates DX Manager. A processor 19 may be included within, or outside, manager 12 to execute program code described below. A directory service agent 14 is a directory server process, one or more of which can run on each computer 16 in a network comprising a directory backbone. The DSAs 14 within the network 10 co-operate, through the chaining of directory requests, to satisfy the current load placed upon them by directory applications within the network 10. The monitoring role of manager 12 is to visualize this load by keeping an internal data structure, known as the DSA dictionary 18, representing the current state of each DSA 14 in the network.

The DSA dictionary 18 within manager 12 implements a JAVA collection that extends and uses existing ArrayList and TreeMap classes to provide a searchable and aggregatable list of items. In this example, each item represents DSA information in the form of a hash-table (TreeMap) of attributes and values, e.g. name of the DSA, hostname of server, port number, prefix etc. However, it should be understood that this is merely one example and the searchable and aggregatable list of items may represent any desired group of items.

FIG. 1B is a block diagram of manager 12 of network 10 according to the teachings of the invention. Manager 12 includes a directory service agent dictionary module 18 (as described above), manager and report servlets module 22, and may issue polling threads 24. Dictionary module 18 includes a searchable list data structure 20, described in greater detail below. In general, searchable list data structure 20 is an extended JAVA ArrayList class with searching methods and aggregating methods, in one embodiment.

Manager's 12 polling threads 24 reference the directory service agent dictionary 18 during each poll, updating information on DSA state, health and load of a directories 11. Manager and report servlets modules 22 search dictionary 18, returning specific information applicable to the current view and aggregations of health and load for each distinct group. Manager's 12 definition of a directory service agent group is flexible, in this embodiment, being based on any chosen attribute. For example directory service agents can be grouped by region (in the same location), hostname (running on the same computer), part of a multiwrite group (replicate the same information), namespace prefix (responsible for the same namespace partition), database name (connected to the same database), auth-level (running at the same security level), having a replication queue (because of a network or system outage), under load (specific performance counters larger than a threshold value), and alarm, warning, diagnostic counters non-zero (showing a problem), these last groups are dynamic by nature. Thus, directory service agents 14 may appear and disappear from the group depending on their health and load. This behavior is ideal, as in general, good monitoring systems should only show information as it becomes relevant. Additional details of searchable list data structure 20 in dictionary 18 are described in greater detail below with reference to FIG. 2.

FIG. 2 is a block diagram of a representation of searchable list data structure 20. Searchable list data structure 20 is a list 22 implemented, according to the teachings of the invention, by a JAVA class called, in this example, SearchableList, which is an extension of the existing JAVA ArrayList class Searchable list data structure 20 holds a number of items, implemented by a JAVA class called, in this example, SearchableItem, which is an extension of the existing TreeMap class referred to herein as searchable item data structure 24.

Objects have attributes and values. For example, a server may have a server name, port number, etc. as attributes with corresponding values. An easy way to store this information is in a hash table, such as that shown in FIG. 2. In JAVA, a hash table is implemented by the TreeMap class. According to the teachings of the invention, a new class that has TreeMap built inside it to hold attributes and methods and to set, get, and aggregate attributes is utilized. This new class is referred to herein as thesearchable item data structure 24. Thus, searchable item data structure 24 is an object that can store attributes and values. A collection of searchable item data structures 24 is stored in searchable list data structure 20, as illustrated in FIG. 2. As an example, each searchable item 24 may represent a person and its attributes may be name, age, salary, hobbies, etc. In the example of FIG. 2, each searchable item 24 includes name, host, and port attributes, as well as additional attributes.

A searchable item 24 representing each DSA 14 is detected during polling by manager 12. As described above, the searchable list data structure 20 extends the JAVA ArrayList class to support additional methods to allow it to be searched, sorted and aggregated by any attribute. Each searchable item data structure 24 does not have to have the same number of keys 26. If a specific key 26 is not present then a search of the list 22 for items 24 with that key will not return it. Similarly searching the list for items that do not contain a value for that key 26 should return it. Additional details of the searchable list data structure 20 and searchable item data structure 24 are described with reference to FIG. 3.

Figure 3:
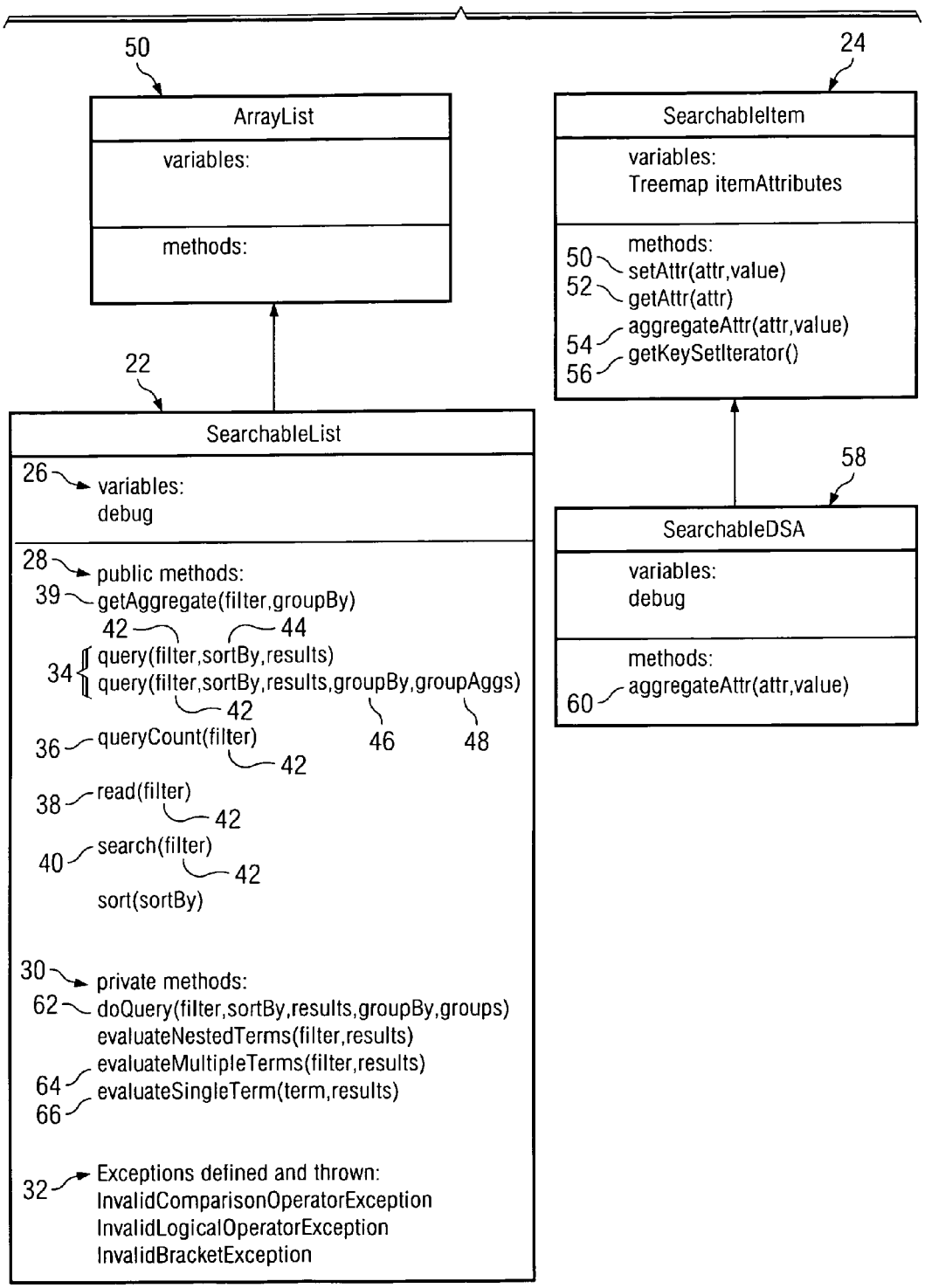
FIG. 3 is a block diagram showing a class hierarchy of class and used by the manager of FIG. 1B.

FIG. 3 is a block diagram showing the searchable list data structure 20 and searchable item data structure 24. As described above, searchable list data structure 20 is a JAVA class that extends the well-known ArrayList JAVA class, illustrated in FIG. 3 by reference numeral 50. In this embodiment, searchable list data structure 20 includes a plurality of JAVA variables 26, JAVA public methods 28, JAVA private methods 30, and JAVA exceptions 32. Methods of particular note in searchable list data structure 20 are the query 34, queryCount 36, read 38, and search 40 methods.

Query method 34 returns all the objects that match the search criteria defined in a search filter 42. The results are optionally sorted by an attribute specified in the sortBy parameter 44 of query method 34. The groupBy parameter 46 and groupAggs parameter 48 are optional, indicating whether aggregation is required. If specified the groupAggs parameter 48 contains a searchable list 20 of items representing the aggregation for each group.

QueryCount method 36 returns the number of items that match search filter 42. Read method 38 returns a single item if it is known that a particular search matches just one item. Search method 40 is similar to query method 34 but simpler; search method 40 does not support parameters for sorting and grouping, in one embodiment.

As described above, searchable list data structure 20 extends the well-known ArrayList class 50 of JAVA, implementing the methods that act on it as described above. This approach could also be applied to other classes, for example the Vector class.

In the illustrated embodiment of FIG. 2, a plurality of searchable item data structures 24 are stored in searchable list 20. Referring back to FIG. 3, searchable item data structure 24 includes, in this embodiment, a setAttr (attr, value) method 50, a getAttr (attr) method 52, an aggregate Attr (attr value) method 54, and a getKeySetIterator( ) method 56. In this example, other objects could be stored in searchable list data structure 20 provided they implement the setAttr(attr, value) 50, getAttr(attr) 52, aggregateAttr(attr) 54, and getKeySetIterator( ) 56 methods.

The searchable item data structure 24 is a convenient hash table for storing an entity's attributes and values. For example a user can be defined using the following statements. This example stores string values but other types of object value are equally permissible:

```
SearchableItem s = new SearchableItem( );
    s.setAttr("name", "Mike Smith");
    s.setAttr("title", "Architect");
    s.setAttr("location", "Mooroolbark");
    s.setAttr("car-make", "Subaru");
    s.setAttr("team", "Tools");
    s.setAttr("open-items", "10");
```

The value of any attribute can be retrieved with the getAttr, for example:

String title=(String) s.getAttr("title");

As described above, the searchable item data structure 24 implements the aggregateAttr( ) 54 method. This method is passed a running total of a specific attribute, by the searchable list data structure 20 when aggregating, to which it adds the current instance value. The method in this class supports aggregation of numeric string or integer values.

Searchable DSA class 58 extends the searchable item class 24 to override the aggregation method in order to provide a mechanism to aggregate states of directory server 11. A directory service agent 14 may be running or stopped, and in a monitoring environment it is useful to have an aggregated state for a group of DSAs. The aggregateAttr( ) method 60 in the Searchable DSA class 58 specifically aggregates the "state" attribute using the following rule:

| Passed Value | + | Current Value | = | New Value |
|---|---|---|---|---|
| running |  | running |  | running |
| stopped |  | stopped |  | stopped |
| running |  | stopped |  | partial |
| stopped |  | running |  | partial |
| partial |  | running |  | partial |
| partial |  | stopped |  | partial |

In one embodiment, searchable lists 20's public query 34, queryCount 36, read 38, search 38, and getAggregate 39 methods all call the private doQuery method 62. This method 62 performs a number of functions. For example:

For example, method 62 validates filter 42, checking if it contains a balanced number of bracketed terms. Method 62 also calls the evaluateNestedTerms method 64 to process the terms within the filter. This will return both the results of the query and the number of objects that match. It breaks the search filter down into a series of nested and non-nested terms based on parsing the filter for brackets. For each nested term it recursively calls itself (the evaluateNestedTerms method 64). For non-nested terms it calls the evaluateMultipleTerms method 66 which will either call itself or call the evaluateSingleTerm method 64. This algorithm will descend to the innermost term and start evaluating it outwards until the whole filter is processed.

Method 62 may also perform any sorting according to the sortBy parameter, if specified, as well as perform any group aggregation according to the groupBy parameter, if specified. Method 62 may also return the results, sorted, and aggregated as required.

Filter 42, described above, may take the following form, in one embodiment.

| | | |
|---|---|---|
| <Filter> | ::= | <FilterTerm> \| |
| | | <FilterTerm><LogicalOp> <Filter> |
| <LogicalOp> | ::= | "\|\|" \| "&&" |
| <FilterTerm> | ::= | "(" <AttrName> <ComparisonOp> <AttrValue> ")" |
| <AttrName> | ::= | Name of the DSA attribute |
| <ComparisonOp> | ::= | "==" \| "!=" \| |
| | | "<" \| "<=" \| ">" \| ">=" |
| <AttrValue> | ::= | Value of the DSA attribute |
| | | '*' can be used as a value prefix or suffix for starts-with and ends-with matching with the "==" and "!=" operators. |

Some examples of valid filters are shown below:

- (name==democorp) && (host==smimi13)
- ( (region==A) && (searches>=100) ) \|\| (region==B)
- (name==democorp2) \|\|
  ( (binds==11) && (region==B) ) \|\|
  ( (region==A) && (host==echidna) && (name==router) )
  \|\|
  (region==Z)
- ( ( (region==A) && (host==ech*) ) && ( (name==r*) \|\| (name=d*) ) ) \|\|
  ( (host==z*) && (name==*2) )
- (region!=A) && (name=labtrack*) && (alarms>0)

FIG. 4 is a flowchart illustrating another example use of the teachings of the invention. In this example, a directory stores information regarding a plurality of schools in a directory, and it is decided that it is desirable to have a list of all people at all schools.

The method begins at step 202. At step 204, data regarding the schools is read and stored in a directory in a searchable list data structure (such as searchable list data structure 20) that includes a plurality of searchable items (such as searchable items 24). Each search item 24 has a plurality of attributes. In this example, one attribute may be object type. Thus, in this example, it would be desirable to search the searchable list for all attributes that have an object type of "person," in order to produce a list of all people at the schools. Other object types may be "book," "physical property," "intangible object," etc. Conventionally, such a search may not be possible if the "person" object key was not predefined as a searchable key in which a search may be performed.

According to the teachings of the invention, however, searchable list 20 includes methods that allow searching of searchable items by any arbitrary attribute, such as in this example, the object=person attribute. Thus, in response to the desire to determine all objects that are people at a school, indicated by reference numeral 206, a query method (such as query method 34) is called at step 208 with a filter (such as filter 42) that represents the desired search. It is noted that the filter specifies the key that will be searched open, but the filter is not limited to only specific keys, but rather can search on any attribute. Further, such a filter may incorporate Boolean combinations, as described above. In response, each searchable item 24 is examined and only those items meeting the search criteria object=person are returned at step 210. Further, if aggregation is desired, a further method such as the aggregate Attr (attr value) method of the searchable item 24 may be invoked. For example, the age of each returned item corresponding to a person may be returned so an average age may be easily determined. The method concludes at step 212.

Conventional techniques relied upon predefined keys for which searches could be performed, rather than being able to search on any attribute within the class. In contrast, embodiments of the invention encapsulate this searching ability into JAVA classes.

Although the present invention and its advantages have been described in detail, it should be understood that various changes, substitutions, and alterations can be made therein without departing from the spirit and scope of the invention as defined by the appended claims.

Appendix

The class hierarchy of one embodiment of the classes described above is provided below.

Class Hierarchy

- class java.lang.Object
    - class java.util.AbstractCollection (implements java.util.Collection)
        - class java.util.AbstractList (implements java.util.List)
            - class java.util.ArrayList (implements java.lang.Cloneable, java.util.List, java.util.RandomAccess, java.io.Serializable)
                - class com.ca.directory.dxmanager.SearchableList
    - class junit.framework.Assert
        - class junit.framework.TestCase (implements junit.framework.Test)
            - class com.ca.directory.dxmanager.SearchableListTest
    - class com.ca.directory.dxmanager.SearchableItem
        - class com.ca.directory.dxmanager.DSA
    - class com.ca.directory.dxmanager.SearchableListComparator (implements java.util.Comparator)

Example additional details of one implementation of DSA class 58 are described below.

Class DSA java.lang.Object
  └ com.ca.directory.dxmanager.SearchableItem
      └ com.ca.directory.dxmanager.DSA

--- public class DSA
extends SearchableItem

A DSA Class.

1. The DSA class extends SearchableItem.
2. Each attribute has a type and value.
3. The constructor mandates a host and DSA name.

| Constructor Summary |
|---|
| DSA(java.lang.String host,    java.lang.String name) Constructor. |

| Method Summary | |
|---|---|
| void | aggregateAttr(java.lang.String attr, java.lang.String value) This method aggregates the state attribute. |

| Methods inherited from class com.ca.directory.dxmanager.SearchableItem |
|---|
| debug, getAttr, getKeySetIterator, setAttr |

| Methods inherited from class java.lang.Object |
|---|
| clone, equals, finalize, getClass, hashCode, notify, notifyAll, toString, wait, wait, wait |

Constructor Detail

DSA

```
public DSA(java.lang.String host,
           java.lang.String name)
```
Constructor.

Parameters:
    host - the hostname of the machine on which the DSA exists.
    name - the name of the DSA, e.g. DemoCorp.

Method Detail aggregateAttr

```
public void aggregateAttr(java.lang.String attr,
                          java.lang.String value)
```
This method aggregates the state attribute. Numeric attribute are aggregates using the parent (SearchableItem) class's method.

Overrides:
aggregateAttr in class SearchableItem

Parameters:
attr - the name of the DSA attribute to aggregate.
value - its value.

Example additional details of one implementation of searchable item class 24 are described below.

Class SearchableItem java.lang.Object
  └com.ca.directory.dxmanager.SearchableItem
Direct Known Subclasses:
    DSA

--- public class SearchableItem
extends java.lang.Object

A SearchableItem Class.

1. A SearchableItem has any number of attributes.
2. Each attribute has a type and value.
3. No attributes are mandatory but if an instance is substantiated with a parameter then the parameter is used as its name attribute.
4. The attributes are kept in a hash table.
5. The setAttr and getAttr methods take the attribute name.

| Constructor Summary |
|---|
| SearchableItem() <br>     Constructor. |
| SearchableItem(java.lang.String name) |

| Method Summary | |
|---:|---|
| void | aggregateAttr(java.lang.String attr, java.lang.String value) <br>     Method to aggregate numeric attribute value given its name. |
| void | debug() <br>     Method to print out all the attributes in the item. |
| java.lang.String | getAttr(java.lang.String attr) <br>     Method to return an |

|   | attribute value given its name. |
|---|---|
| java.util.Iterator | getKeySetIterator()<br>Method to return all the attribute names. |
| void | setAttr(java.lang.String attr, java.lang.String value)<br>Method to set an attribute value given its name. |

| Methods inherited from class java.lang.Object |
|---|
| clone, equals, finalize, getClass, hashCode, notify, notifyAll, toString, wait, wait, wait |

Constructor Detail

SearchableItem public SearchableItem()
    Constructor.

---

SearchableItem public SearchableItem(java.lang.String name)

Method Detail getAttr public java.lang.String getAttr(java.lang.String attr)
    Method to return an attribute value given its name.
    Parameters:
    attr - the name of the attribute to retrieve.
    Returns:
    the value of the attribute.

--- setAttr public void setAttr(java.lang.String attr,
                java.lang.String value)

Method to set an attribute value given its name.
Parameters:
attr - the name of the attribute to set.
value - its value.

--- aggregateAttr public void aggregateAttr(java.lang.String attr,
                      java.lang.String value)
    Method to aggregate numeric attribute value given its name.
    Parameters:
    attr - the name of the attribute to aggregate.
    value - its value.

--- getKeySetIterator public java.util.Iterator getKeySetIterator()
    Method to return all the attribute names.
    Returns:
    a set of attribute names.

--- debug public void debug()
    Method to print out all the attributes in the item.

Example additional details of one implementation of searchable list class 20 are described below.

Class SearchableList

```
java.lang.Object
  └java.util.AbstractCollection
      └java.util.AbstractList
          └java.util.ArrayList
              └com.ca.directory.dxmanager.SearchableList
```

All Implemented Interfaces:

java.lang.Cloneable,      java.util.Collection,
java.util.List,      java.util.RandomAccess,
java.io.Serializable

--- public class SearchableList
extends java.util.ArrayList

A SearchableList Class. Used to hold, sort and aggregate SearchableListItems.

1. Supports two query methods allowing searching using a boolean query filter.
2. Results can be sorted by a particular attribute.
3. Results are returned in another SearchableList.
4. Results can be grouped by a particular attribute. Each attribute is aggregated within each group.
5. Aggregated groups are returned in another SearchableList.

See Also:
     ArrayList, Serialized Form

| Field Summary |
|---|

| Fields inherited from class java.util.AbstractList |
|---|
| modCount |

| Constructor Summary |
|---|
| SearchableList() |

| | |
|---|---|
| | Constructs an empty list. |
| SearchableList(int initialCapacity) | |
| | Constructs an empty list with the specified initial capacity. |

| Method Summary | |
|---|---|
| void | debug(java.lang.String msg)<br>    Debug routing to print out some internals. |
| int | query(java.lang.String filter,<br>java.lang.String sortby, SearchableList results)<br>    Returns all the objects with the specified attribute value optionally sorted by a specified attribute. |
| int | query(java.lang.String filter,<br>java.lang.String sortby, SearchableList results,<br>java.lang.String groupby, SearchableList groups)<br>    Returns all the objects with the specified attribute value optionally sorted by a specified attribute and aggregated into groups using the groupby parameter. |
| void | sort(java.lang.String compareOn)<br>    Sort the elements according to a given attribute. |

| Methods inherited from class java.util.ArrayList |
|---|
| add, add, addAll, addAll, clear, clone, contains, ensureCapacity, get, indexOf, isEmpty, lastIndexOf, remove, removeRange, set, size, toArray, toArray, trimToSize |

| Methods inherited from class java.util.AbstractList |
|---|
| equals, hashCode, iterator, listIterator, listIterator, subList |

| Methods inherited from class java.util.AbstractCollection |
|---|
| containsAll, remove, removeAll, retainAll, toString |

| Methods inherited from class java.lang.Object |
|---|
| finalize, getClass, notify, notifyAll, wait, wait, wait |

| Methods inherited from interface java.util.List |
|---|
| containsAll, equals, hashCode, iterator, listIterator, listIterator, remove, removeAll, retainAll, subList |

Constructor Detail

SearchableList public SearchableList(int initialCapacity)
    Constructs an empty list with the specified initial capacity.

---

SearchableList public SearchableList()
    Constructs an empty list.

Method Detail sort public void sort(java.lang.String compareOn)
    Sort the elements according to a given attribute.
    Parameters:
    compareOn - the attribute on which to sort.

query

```
public int query(java.lang.String filter,
                 java.lang.String sortby,
                 SearchableList results)
          throws
com.ca.directory.dxmanager.InvalidLogicalOperatorExceptio
n, com.ca.directory.dxmanager.InvalidComparisonOperatorExcep
tion, com.ca.directory.dxmanager.InvalidBracketException
```
    Returns all the objects with the specified attribute value optionally sorted by a specified attribute.

1. Support a boolean filter of the form:

```
   <Filter>      :== <FilterTerm> | <FilterTerm>
   <LogicalOp> <Filter>
   <LogicalOp>   :== "||" | "&&"
   <FilterTerm>  :== "(" <AttrName> <ComparisonOp>
   <AttrValue> ")"
   <AttrName>    :== Name of the DSA attribute
   <ComparisonOp> :== "==" | "!=" | "<" | "<=" |
   ">" | ">="
   <AttrValue>   :== Value of the DSA attribute.
   ```
   '*' can be used as a value prefix or suffix for startswith and endswith matching with "==" and "!=" operators.
2. Examples are: (name==democorp)&&(host==smimi13)
3. Spaces and tabs are removed from the filter.

Parameters:
filter - the filter to apply.
sortby - the attribute by which to sort.
results - the list to which to add results.
Returns:
a count of the number of matches.
Throws:
com.ca.directory.dxmanager.InvalidLogicalOperatorExc
eption
com.ca.directory.dxmanager.InvalidComparisonOperator
Exception
com.ca.directory.dxmanager.InvalidBracketException query

```
public int query(java.lang.String filter,
                 java.lang.String sortby,
                 SearchableList results,
                 java.lang.String groupby,
                 SearchableList groups)
          throws
com.ca.directory.dxmanager.InvalidLogicalOperatorExceptio
n,
``` com.ca.directory.dxmanager.InvalidComparisonOperatorException, com.ca.directory.dxmanager.InvalidBracketException
    Returns all the objects with the specified attribute value optionally sorted by a specified attribute and aggregated into groups using the groupby parameter. If the groupby is specified it will also return a SearchableList of groups, each item in the returned list is a SearchableItem containing aggregated values for each group.

1. Support a boolean filter of the form:

```
<Filter> :== <FilterTerm> | <FilterTerm>
<LogicalOp> <Filter>
<LogicalOp> :== "||" | "&&"
<FilterTerm> :== "(" <AttrName> <ComparisonOp>
<AttrValue> ")"
<AttrName> :== Name of the DSA attribute
<ComparisonOp> :== "==" | "!=" | "<" | "<=" |
">" | ">="
<AttrValue> :== Value of the DSA attribute.
'*' can be used as a value prefix or suffix for
startswith and endswith matching with "==" and
"!=" operators.
```
    2. Examples are: (name==democorp)&&(host==smimi13)
    3. Spaces and tabs are removed from the filter.

Parameters:
filter - the filter to apply.
sortby - the attribute by which to sort.
results - the list to which to add results.
groupby - the attribute by which to group.
groups - the list of groups. Each group contains a DSA conject with aggregated values for that group.
Returns:

a count of the number of matches.
Throws:
com.ca.directory.dxmanager.InvalidLogicalOperatorException
com.ca.directory.dxmanager.InvalidComparisonOperatorException
com.ca.directory.dxmanager.InvalidBracketException

--- debug public void debug(java.lang.String msg)
    Debug routing to print out some internals.
    Parameters:
    msg - the string to print prior to the debug output.

Example additional details of one implementation of additional classes are described below.

Class SearchableListComparator java.lang.Object
  └com.ca.directory.dxmanager.SearchableListComparator
All Implemented Interfaces:
    java.util.Comparator

--- public class SearchableListComparator
extends java.lang.Object
implements java.util.Comparator A SearchableList Comparator Class.

1. A custom comparator to sort SearchableItems by any specified attribute.

| Constructor Summary |
|---|
| SearchableListComparator(java.lang.String compareOn)<br>    Constructor. |

| Method Summary | |
|---|---|
| int | compare(java.lang.Object o1,    java.lang.Object o2)<br>    Method to compare attributes. |

| Methods inherited from class java.lang.Object |
|---|
| clone, equals, finalize, getClass, hashCode, notify, notifyAll, toString, wait, wait, wait |

| Methods inherited from interface java.util.Comparator |
|---|
| equals |

Constructor Detail

SearchableListComparator

```
public
SearchableListComparator(java.lang.String compareOn)
     Constructor.
Parameters:
     compareOn - the attribute to compare.
```

Method Detail compare

```
public int compare(java.lang.Object o1,
                   java.lang.Object o2)
     Method to compare attributes. If the attribute is
     numeric then an integer comparison is performed.
     Specified by:
     compare in interface java.util.Comparator
     Parameters:
     o1 - compare this.
     o2 - with this.
     Returns:
     result of comparison -ve, 0 or +ve
```

Class SearchableListTest java.lang.Object
  └junit.framework.Assert
      └junit.framework.TestCase
           └com.ca.directory.dxmanager.SearchableListTest

All Implemented Interfaces:
    junit.framework.Test

--- public class SearchableListTest
extends junit.framework.TestCase

A SearchableListTest Class.

1. This class tests the SearchableList Class.
2. An initial dataset is created holding DSA instances.
3. A number of queries are performed on the class to test it.
4. Each test specifies the expected results so that a pass/fail status can be displayed.
5. If the initial dataset changes then the expected number of results may need to be adjusted.
6. Currently the groupby needs to be checked by manually.

| Constructor Summary |
|---|
| SearchableListTest(java.lang.String arg) |

| Method Summary | |
|---|---|
| protected void | setUp() |
| static junit.framework.Test | suite() |
| void | testBeginningEnding() |
| void | testEqualityMatchNoSort()<br>Tests. |
| void | testEqualityMatchWithSort() |

| | | |
|---|---:|---|
| | void | testGrouping() |
| | void | testLessThanGreaterThanNumeric() |
| | void | testLessThanGreaterThanString() |
| | void | testLogicalAndOrWithSort() |
| | void | testLogicalAndWithSort() |
| | void | testLogicalOrWithSort() |
| | void | testNestedBracketsWithSort() |
| | void | testNotEqualsMatchWithSort() |
| | void | testQuery(SearchableList list, java.lang.String filter, java.lang.String sortby, SearchableList results, java.lang.String groupby, SearchableList groups, int expected)<br>　　　　Method to test the SearchableList's query method. |

| Methods inherited from class junit.framework.TestCase |
|---|
| countTestCases, createResult, getName, run, run, runBare, runTest, setName, tearDown, toString |

| Methods inherited from class junit.framework.Assert | | | |
|---|---|---|---|
| assertEquals, | assertEquals, | assertEquals, | assertEquals, |
| assertEquals, | assertEquals, | assertEquals, | assertEquals, |
| assertEquals, | assertEquals, | assertEquals, | assertEquals, |
| assertEquals, | assertEquals, | assertEquals, | assertEquals, |
| assertEquals, | assertEquals, | assertEquals, | assertEquals, |

| assertFalse, assertFalse, assertNotNull, assertNotNull, assertNotSame, assertNotSame, assertNull, assertNull, assertSame, assertSame, assertTrue, assertTrue, fail, fail |

| Methods inherited from class java.lang.Object |
|---|
| clone, equals, finalize, getClass, hashCode, notify, notifyAll, wait, wait, wait |

Constructor Detail

SearchableListTest public SearchableListTest(java.lang.String arg)

Method Detail setUp protected void setUp()

--- testEqualityMatchNoSort public void testEqualityMatchNoSort()
    Tests.

--- testEqualityMatchWithSort public void testEqualityMatchWithSort()

--- testNotEqualsMatchWithSort public void testNotEqualsMatchWithSort()

--- testLogicalOrWithSort public void testLogicalOrWithSort()

--- testLogicalAndWithSort public void testLogicalAndWithSort()

--- testLogicalAndOrWithSort public void testLogicalAndOrWithSort()

--- testNestedBracketsWithSort public void testNestedBracketsWithSort()

--- testLessThanGreaterThanString public void testLessThanGreaterThanString()

--- testLessThanGreaterThanNumeric public void testLessThanGreaterThanNumeric()

--- testBeginningEnding public void testBeginningEnding()

--- testGrouping public void testGrouping()

--- testQuery

```
public void testQuery(SearchableList list,
                 java.lang.String filter,
                 java.lang.String sortby,
                 SearchableList results,
                 java.lang.String groupby,
                 SearchableList groups,
                 int expected)
```
   Method to test the SearchableList's query method. It
   will print Pass/Fail depending if the actual number
   of entries returned matches that expected.
   Parameters:

```
list - the dataset to search.
filter - the filter to apply.
sortby - the attribute to sortby.
results - the list to hold the results.
expected - the expected number of results.
``` suite
```
public static junit.framework.Test suite()
```

What is claimed is:

1. A system comprising:
    a processor;
    non-transitory computer-readable media storing code operable to be executed on the processor, the code including a class having objects representing directory servers with associated attributes and also having at least one method, the method being operable, when executed on the processor, to search the objects across any attribute of the objects and aggregate the attribute values of all objects having the searched attribute to monitor the performance of the directory servers; and
    wherein the attributes indicate a level of performance of the directory servers.

2. The system of claim 1, wherein the at least one method comprises a query method having at least a filter parameter, wherein the filter parameter specifies a search criteria, and wherein the query method is operable, when executed on the processor, to return all objects in the class having attribute values specified by the search criteria.

3. The system of claim 2, wherein the query method further comprises a sorting parameter and wherein the query method is operable, when executed on the processor, to sort results of the return of all objects specified by the search filter as specified by the sorting parameter.

4. The system of claim 2, wherein the filter parameter is a Boolean expression of the search criteria.

5. The system of claim 2, wherein the query method further comprises an aggregation selection parameter indicating whether aggregation is desired.

6. The system of claim 2, wherein the query method further comprises a grouping parameter specifying a desired aggregation for the results.

7. The system of claim 1, wherein the objects comprise a plurality of items, wherein at least one of the plurality of items has a different number of keys than at least one other of the plurality of items.

8. The system of claim 7, wherein each of the plurality of items is a class that is an extension of the TreeMap class from the JAVA programming library.

9. The system of claim 1, wherein the objects comprise a plurality of items, each having the following methods implemented using the JAVA programming language:
    setAttr (attr, value), getAttr (attr), aggregateAttr (attr value), and getKeySetIterator,
    wherein the aggregateAttr (attr value) method is operable to sum a value of a specified attribute across the objects.

10. The system of claim 1, wherein the objects comprise a plurality of items stored in a hash table.

11. The system of claim 1, wherein the class is an extension of the-ArrayList class from the JAVA programming library.

12. The system of claim 1, wherein the class is implemented using the JAVA programming language.

13. A system comprising:
    a processor;
    non-transitory computer-readable media storing code to be executed on the processor, the code including a class having searching methods that are operable, when executed on the processor, to allow generic searching of objects that represent directory servers, the generic searching comprising searching any attribute associated with the objects without using pre-defined search criteria and aggregating the attribute values of all objects having the searched attribute to monitor the performance of the directory servers; and
    wherein the attributes indicate a level of performance of the directory servers.

14. The system of claim 13, wherein the at least one method comprises a query method having at least a filter parameter, wherein the filter parameter specifies a search criteria, and wherein the query method is operable, when executed on the processor, to return all objects in the class having attribute values specified by the search criteria.

15. The system of claim 14, wherein the query method further comprises a sorting parameter and wherein the query method is operable, when executed on the processor, to sort results of the return of all objects specified by the search filter as specified by the sorting parameter.

16. The system of claim 14, wherein the filter parameter is a Boolean expression of the search criteria.

17. The system of claim 14, wherein the query method further comprises an aggregation selection parameter indicating whether aggregation is desired.

18. The system of claim 14, wherein the query method further comprises a grouping parameter specifying a desired aggregation for the results.

19. The system of claim 18, wherein each of the plurality of items is a class that is an extension of the TreeMap class from the JAVA programming library.

20. The system of claim 13, wherein the objects comprise a plurality of items, wherein at least one of the plurality of items has a different number of keys than at least one other of the plurality of items.

21. The system of claim 13, wherein the objects comprise a plurality of items, each having the following methods implemented using the JAVA programming language:
    setAttr (attr, value), getAttr (attr), aggregateAttr (attr value), and getKeySetIterator,
    wherein the aggregateAttr (attr value) method is operable to sum a value of a specified attribute across the objects.

22. The system of claim 13, wherein the objects comprise a plurality of items stored in a hash table.

23. The system of claim 13, wherein the class is an extension of the ArrayList class from the JAVA programming library.

24. The system of claim 13, wherein the class is implemented using the JAVA programming language.

25. An apparatus comprising:
    non-transitory computer-readable media storing code to be executed on a processor;
    wherein the code includes a class having objects representing directory servers with associated attributes and also having at least one method, the at least one method being operable, when executed on the processor, to search the objects across any attribute of the objects and aggregate the attribute values of all objects having the searched attribute to monitor the performance of the directory servers; and
    wherein the attributes indicate a level of performance of the directory servers.

26. The apparatus of claim 25, wherein the at least one method comprises a query method having at least a filter parameter, wherein the filter parameter specifies a search criteria, and wherein the query method is operable, when executed on the processor, to return all objects in the class having attribute values specified by the search criteria.

27. The apparatus of claim 26, wherein the query method further comprises a sorting parameter and wherein the query method is operable, when executed on the processor, to sort results of the return of all objects specified by the search filter as specified by the sorting parameter.

28. The apparatus of claim 26, wherein the filter parameter is a Boolean expression of the search criteria.

29. The apparatus of claim 26, wherein the query method further comprises an aggregation selection parameter indicating whether aggregation is desired.

30. The apparatus of claim 26, wherein the query method further comprises a grouping parameter specifying a desired aggregation for the results.

31. The apparatus of claim 25, wherein the objects comprise a plurality of items, wherein at least one of the plurality of items has a different number of keys than at least one other of the plurality of items.

32. The apparatus of claim 25, wherein the objects comprise a plurality of items, each having the following methods implemented using the JAVA programming language:
   setAttr (attr, value), getAttr (attr), aggregateAttr (attr value), and getKeySetIterator,
   wherein the aggregateAttr (attr value) method is operable to sum a value of a specified attribute across the objects.

33. The apparatus of claim 25, wherein the objects comprise a plurality of items, stored in a hash table.

34. The apparatus of claim 25, wherein the class is an extension of the-ArrayList class from the JAVA programming library.

35. The apparatus of claim 31, wherein each of the plurality of items is a class that is an extension of the TreeMap class from the JAVA programming library.

36. The apparatus of claim 25, wherein the class is implemented using the JAVA programming language.

37. A method for searching a directory comprising:
   storing a plurality of items;
   executing code, the code stored on non-transitory computer-readable media and including a class having objects representing directory servers with associated attributes and also having at least one method, the method being operable, when executed on a processor, to search the objects across any attribute of the objects and aggregate the attribute values of all objects having the searched attribute to monitor the performance of the directory servers; and
   wherein the attributes indicate a level of performance of the directory servers.

38. The method of claim 37, wherein the at least one method comprises a query method having at least a filter parameter, wherein the filter parameter specifies a search criteria, and wherein the query method is operable, when executed on the processor, to return all objects in the class having attribute values specified by the search criteria.

39. The method of claim 38, wherein the query method further comprises a sorting parameter and wherein the query method is operable, when executed on the processor, to sort results of the return of all objects specified by the search filter as specified by the sorting parameter.

40. The method of claim 38, wherein the filter parameter is a Boolean expression of the search criteria.

41. The method of claim 38, wherein the query method further comprises an aggregation selection parameter indicating whether aggregation is desired.

42. The method of claim 38, wherein the query method further comprises a grouping parameter specifying a desired aggregation for the results.

43. The method of claim 37, wherein the objects comprise a plurality of items, wherein at least one of the plurality of items has a different number of keys than at least one other of the plurality of items.

44. The method of claim 43, wherein each of the plurality of items is a class that is an extension of the TreeMap class from the JAVA programming library.

45. The method of claim 37, wherein the objects comprise a plurality of items, each having the following methods implemented using the JAVA programming language:
   setAttr (attr, value), getAttr (attr), aggregateAttr (attr value), and getKeySetIterator,
   wherein the aggregateAttr (attr value) method is operable to sum a value of a specified attribute across the objects.

46. The method of claim 37, wherein the objects comprise a plurality of items, stored in a hash table.

47. The method of claim 37, wherein the class is an extension of the ArrayList class from the JAVA programming library.

48. The method of claim 37, wherein the class is implemented using the JAVA programming language.

49. A computer implemented method of tracking the health and load of directory servers, comprising:
   polling one or more directory servers to determine performance information associated with the one or more directory servers, the performance information indicating a level of performance of the one or more directory servers;
   storing the performance information associated with the one or more directory servers in a dictionary of directory servers, the dictionary containing one or more attributes associated with the one or more directory servers;
   searching the dictionary to identify each of the one or more directory servers having one or more searched attributes;
   aggregating the one or more searched attributes of the one or more directory servers having the one or more searched attributes to monitor the performance of the one or more directory servers;
   displaying the one or more attributes associated with each of the one or more directory servers identified by the search; and
   wherein the one or more directory servers comprise one or more computers operable to provide a directory service.

50. The method of claim 49, wherein displaying the one or more attributes associated with each directory server identified by the search further comprises:
   sorting the directory servers identified by the search based on a sorting attribute; and
   displaying the one or more attributes associated with each directory server identified by the search based on the order determined by sorting the directory servers.

51. The method of claim 49, wherein displaying the one or more attributes associated with each of the one or more directory servers identified by the search further comprises:
   grouping the one or more directory servers identified by the search based on a grouping attribute;
   aggregating the attribute values for each of the one or more attributes associated with each directory server for each group; and
   displaying the aggregated values of the one or more attributes for each group.

52. The method of claim 49, wherein the performance information comprises at least one of the following:
   state information identifying whether a particular directory server is running or stopped;
   load information identifying a current load of the particular directory server;
   error information identifying a total number of errors encountered by the particular directory server; or
   operation information indentifying a total number of directory operations performed by the particular directory server.

53. The method of claim 49, wherein the one or more attributes associated with the one or more directory servers comprises at least one of the following:
- an attribute identifying a location of a particular directory server;
- an attribute identifying a hostname of the particular directory server;
- an attribute identifying a port that the particular directory server is using; or
- an attribute identifying performance information associated with the particular directory server.

54. The method of claim 49, wherein displaying the one or more attributes associated with each directory server identified by the search comprises updating the display when the searched attributes for any of the one or more directory servers change in value.

* * * * *